United States Patent
Tanaka et al.

(10) Patent No.: US 9,751,608 B2
(45) Date of Patent: Sep. 5, 2017

(54) COMPOSITE MATERIAL STRUCTURE, AND AIRCRAFT WING AND AIRCRAFT FUSELAGE PROVIDED THEREWITH

(75) Inventors: Yuya Tanaka, Tokyo (JP); Hideyuki Suzuki, Tokyo (JP); Yutaka Kanayama, Tokyo (JP); Kazuki Sato, Tokyo (JP); Masatake Hatano, Tokyo (JP); Satoru Saito, Tokyo (JP); Akihisa Watanabe, Tokyo (JP); Ryo Abe, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 647 days.

(21) Appl. No.: 13/881,590

(22) PCT Filed: Jan. 26, 2012

(86) PCT No.: PCT/JP2012/051699
§ 371 (c)(1),
(2), (4) Date: Apr. 25, 2013

(87) PCT Pub. No.: WO2012/105415
PCT Pub. Date: Aug. 9, 2012

(65) Prior Publication Data
US 2013/0236692 A1    Sep. 12, 2013

(30) Foreign Application Priority Data
Feb. 4, 2011  (JP) .................. 2011-023154

(51) Int. Cl.
*B64C 3/26*    (2006.01)
*B64C 1/06*    (2006.01)
(Continued)

(52) U.S. Cl.
CPC .............. *B64C 1/064* (2013.01); *B64C 3/182* (2013.01); *B64C 3/20* (2013.01); *B64C 3/26* (2013.01);
(Continued)

(58) Field of Classification Search
CPC ....................................................... B64C 3/26
(Continued)

(56) References Cited

U.S. PATENT DOCUMENTS 4,643,646 A    2/1987  Hahn et al.
4,732,542 A    3/1988  Hahn et al.
(Continued)

FOREIGN PATENT DOCUMENTS

FR    2 906 785    4/2008
JP    62-157894    7/1987
(Continued)

OTHER PUBLICATIONS

International Search Report issued May 1, 2012 in International (PCT) Application No. PCT/JP2012/051699.
(Continued)

*Primary Examiner* — William P Watkins, III
(74) *Attorney, Agent, or Firm* — Wenderoth, Lind & Ponack, L.L.P.

(57) ABSTRACT

A composite material structure reinforced against stress concentration in peripheral edge portions of holes and enabled to be reduced in weight. A wing (1) is formed in a box structure. A lower surface outer plate (3) of the wing (1) includes: a center section (3b) made of metal extending in one direction and having access holes (5) formed therein; a front section (3a); and a rear section (3c) made of fiber reinforced plastics extending in the one direction and con-
(Continued)

nected to both side portions of the center section (3b). As the metal used for the center section (3b), a titanium alloy or an aluminum alloy is suitable.

6 Claims, 6 Drawing Sheets

(51) Int. Cl.
- *B64C 3/18* (2006.01)
- *B64C 3/20* (2006.01)
- *B64C 1/00* (2006.01)
- *B64C 1/14* (2006.01)
- *B64C 3/34* (2006.01)

(52) U.S. Cl.
CPC ........ *B64C 1/14* (2013.01); *B64C 3/34* (2013.01); *B64C 2001/0072* (2013.01); *Y02T 50/433* (2013.01); *Y10T 428/24322* (2015.01)

(58) Field of Classification Search
USPC .................................................. 428/132, 137
See application file for complete search history.

(56) References Cited

U.S. PATENT DOCUMENTS

| | | | |
|---|---|---|---|
| 4,741,943 A | 5/1988 | Hunt | |
| 4,749,155 A | 6/1988 | Hammer et al. | |
| 5,860,693 A | 1/1999 | Ehrlich | |
| 6,220,651 B1 | 4/2001 | Ehrlich | |
| 7,069,702 B2 | 7/2006 | Ehrlich | |
| 2001/0024055 A1 | 9/2001 | Ehrlich | |
| 2002/0109377 A1 | 8/2002 | Ehrlich | |
| 2003/0042364 A1 | 3/2003 | Tanaka et al. | |
| 2004/0217631 A1 | 11/2004 | Ehrlich | |
| 2005/0053765 A1 | 3/2005 | Albers et al. | |
| 2006/0028050 A1 | 2/2006 | Ehrlich | |
| 2007/0034743 A1 | 2/2007 | Albers et al. | |
| 2008/0172959 A1* | 7/2008 | Pellenkoft et al. | ............. 52/213 |
| 2010/0133380 A1* | 6/2010 | Roebroeks | ............. B32B 15/08 244/119 |
| 2010/0264273 A1 | 10/2010 | Gallant et al. | |

FOREIGN PATENT DOCUMENTS

| | | |
|---|---|---|
| JP | 62-168789 | 7/1987 |
| JP | 3-12232 | 2/1991 |
| JP | 2000-6893 | 1/2000 |
| JP | 2000-135527 | 5/2000 |
| JP | 2001-30997 | 2/2001 |
| JP | 2002-302097 | 10/2002 |
| JP | 2003-72691 | 3/2003 |
| JP | 2003-513821 | 4/2003 |
| JP | 2004-155157 | 6/2004 |
| JP | 2007-504049 | 3/2007 |
| JP | 2010-38245 | 2/2010 |
| JP | 4545339 | 9/2010 |
| JP | 2010-235133 | 10/2010 |
| JP | 2010-540348 | 12/2010 |

OTHER PUBLICATIONS

Written Opinion of the International Searching Authority issued May 1, 2012 in International (PCT) Application No. PCT/JP2012/051699.

Office Action issued Oct. 10, 2014 in corresponding Chinese patent application No. 201280003462.8 (with English translation).

Office Action issued Jan. 6, 2015 in corresponding Japanese patent application No. 2011-023154 (with English translation).

Decision to Grant a Patent issued Jul. 6, 2015 in corresponding Chinese patent application No. 201280003462.8 (with English translation).

Decision to Grant a Patent issued Aug. 11, 2015 in corresponding Japanese patent application No. 2011-023154.

* cited by examiner

COMPOSITE MATERIAL STRUCTURE, AND AIRCRAFT WING AND AIRCRAFT FUSELAGE PROVIDED THEREWITH

BACKGROUND OF THE INVENTION

1. Technical Field

The present invention relates to a composite material structure including holes, and an aircraft wing and an aircraft fuselage having the composite material structure.

2. Description of the Related Art

In the fields of aircrafts, ships, vehicles, and the like, a composite material made of fiber reinforced plastics (FRP) is widely used as a structure increased in strength and reduced in weight. Holes are sometimes formed in such a composite material for inspection and for access during assembly. When the holes are formed, since stress concentration occurs in the peripheral edge portions of the holes, it is necessary to increase the strength of the peripheral edge portions of the holes.

Japanese Translation of PCT international Application, Publication No. 2003-513821 described below discloses an invention for adding a reinforcing layer to increase thickness and increasing strength in order to reinforce the peripheral edge portions of access holes of an outer plate of an aircraft. The reinforcing layer described in this publication is fixed to a base material by pins or stitches to prevent the reinforcing layer from peeling when the reinforcing layer receives a load.

SUMMARY OF THE INVENTION

1. Technical Problem

However, the invention described in JP 2003-513821 has a problem in terms of productivity due to the process for applying the pins or the stitches to the reinforcing layer when the reinforcing layer is added.

As a method of not using such pins or stitches, a lower surface outer plate 103 of a wing 100 of an aircraft having a structure shown in FIGS. 6A-6B is known. As shown in FIG. 6A, a plurality of access holes 102 are formed in the center section in the width direction of the lower surface outer plate 103. The access holes 102 are used for inspection or during assembly of a fuel tank provided in the wing 100. Broken lines shown in the figure indicate contour lines of the wing 100 including a flap and a slat.

To increase the strength of the peripheral edge portions of the access holes 102, as shown in FIG. 6B, a laminate for reinforcement 104 is stacked (padded up) on a base material laminate 106. When viewed in section as shown in FIG. 6B, the laminate for reinforcement 104 has a shape formed with a taper reduced in thickness further away from the access hole 102. To reinforce the access hole 102, a fixed thickness portion 104a located in the peripheral edge portion of the access hole 102 and having fixed thickness is enough. However, if only the fixed thickness portion 104a is formed, peeling occurs in an interface with the base material 106 when the fixed thickness portion 104a receives a load. To prevent peeling, the fixed thickness portion 104a is not only formed but also further extended to form a taper portion 104b. Note that, in FIG. 6B, the taper portion 104b is hatched to facilitate understanding. However, the taper portion 104b and the fixed thickness portion 104a are continuous and formed by the same stacked sheet.

In the structure shown in FIG. 6, the process for applying the pins or the stitches described in JP 2003-513821 is unnecessary. However, from the viewpoint of only reinforcement of the access hole 102, the taper portion 104b is originally unnecessary and is a cause of an increase in weight.

The present invention has been devised in view of such circumstances and it is an object of the present invention to provide a composite material structure that is reinforced against stress concentration in the peripheral edge portions of holes and enabled to be reduced in weight, and an aircraft wing and an aircraft fuselage provided therewith.

2. Solution to the Problem

In order to solve the above-described problems, a composite material structure, and an aircraft wing and an aircraft fuselage provided therewith of the present invention adopt the following solutions.

That is, a composite material structure according to a first aspect of the present invention includes: a structure member with holes made of metal extending in one direction and having holes formed therein; and an adjacent structure member formed as a composite material made of fiber reinforced plastics extending in the one direction and connected to a side portion of the structure member with holes.

Since stress concentration occurs around the holes formed in the structure member with holes, the peripheral edge portions of the holes need to be further increased in thickness than other regions to be reinforced. In the first aspect, since the structure member with holes are made of metal, it is unnecessary to provide the taper portion for peeling prevention in the hole peripheral edge portions unlike the case in which the structure member with holes is a composite material made of fiber reinforced plastics. Therefore, since excess thickness for forming the taper portion can be eliminated, it is possible to realize a structure member with holes reduced in weight.

Note that, examples of the metal used for the structure member with holes include a titanium alloy and an aluminum alloy.

Further, in the composite material structure according to a second aspect of the present invention, a lower surface outer plate of a wing of an aircraft is configured by a plurality of members extending in the longitudinal direction of the wing. Among the members, a member including access holes as the holes formed in the lower surface outer plate is the structure member with holes and another member is the adjacent structure member.

The lower surface outer plate constitutes a lower surface portion of a torque box that bears a load applied to the wing of the aircraft. Therefore, a tensile load is applied to the lower surface outer plate in the longitudinal direction of the wing during flight. Stress concentration is caused by the tensile load in the peripheral edge portions of the access holes. However, in the second aspect, the member in which the access holes are formed is the structure member with holes made of metal. Consequently, since the reinforcement of the peripheral edge portions of the access holes does not involve an increase in weight unlike the composite material, it is possible to provide the wing reduced in weight.

Further, in the composite material structure according to a third aspect of the present invention, an outer plate of a fuselage of an aircraft is configured by a plurality of members extending in the longitudinal direction of the fuselage. Among the members, a member including window holes as the holes formed in the outer plate is the structure member with holes and another member is the adjacent structure member.

A tensile load, a compression load, and a shearing load (i.e., a bending load) are applied to the fuselage of the aircraft in the longitudinal direction. Stress concentration is caused in the peripheral edge portions of the window holes by the tensile load, the compression load, and the shearing load. However, in the third aspect, the member in which the window holes are formed is the structure member with holes made of metal. Consequently, since reinforcement of the peripheral edge portions of the window holes does not involve an increase in weight, unlike the composite material, it is possible to provide a fuselage for the aircraft that is reduced in weight.

3. Advantageous Effects of the Invention

Since the structure member with holes is made of metal, it is unnecessary to provide the taper portion for peeling prevention in the hole peripheral edge portions unlike the case in which the structure member with holes is the composite material made of fiber reinforced plastics. Therefore, since excess thickness for forming the taper portion can be eliminated, it is possible to realize the structure member with holes that is reduced in weight.

DETAILED DESCRIPTION OF THE INVENTION

An embodiment of the present invention is explained below with reference to FIGS. 1 to 3.

Figure 1A:
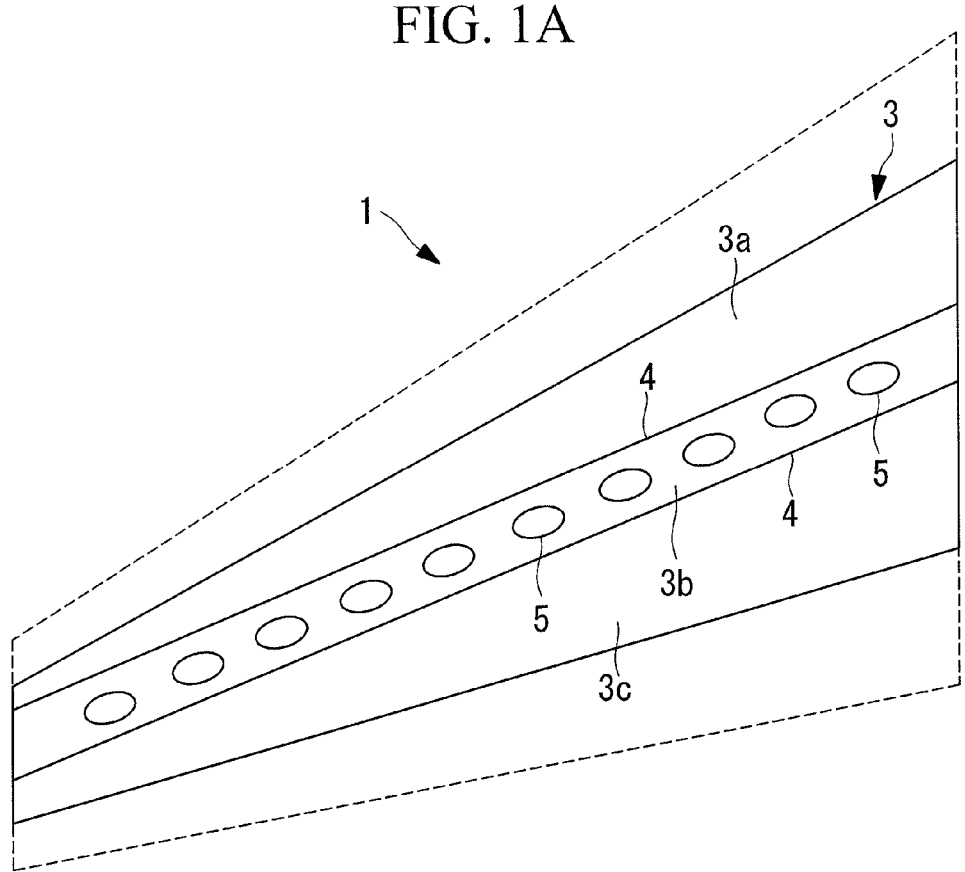
FIG. 1A is a plan view showing a lower surface outer plate of a wing of an aircraft according to an embodiment of a composite material structure of the present invention.

In FIG. 1A, a lower surface outer plate 3 of a wing 1 of an aircraft is shown. The lower surface outer plate 3 is formed by a composite material structure made of fiber reinforced plastics (FRP) and a structure made of metal. Broken lines shown in the figure indicate contour lines of the wing 1 including a flap and a slat.

Figure 2:
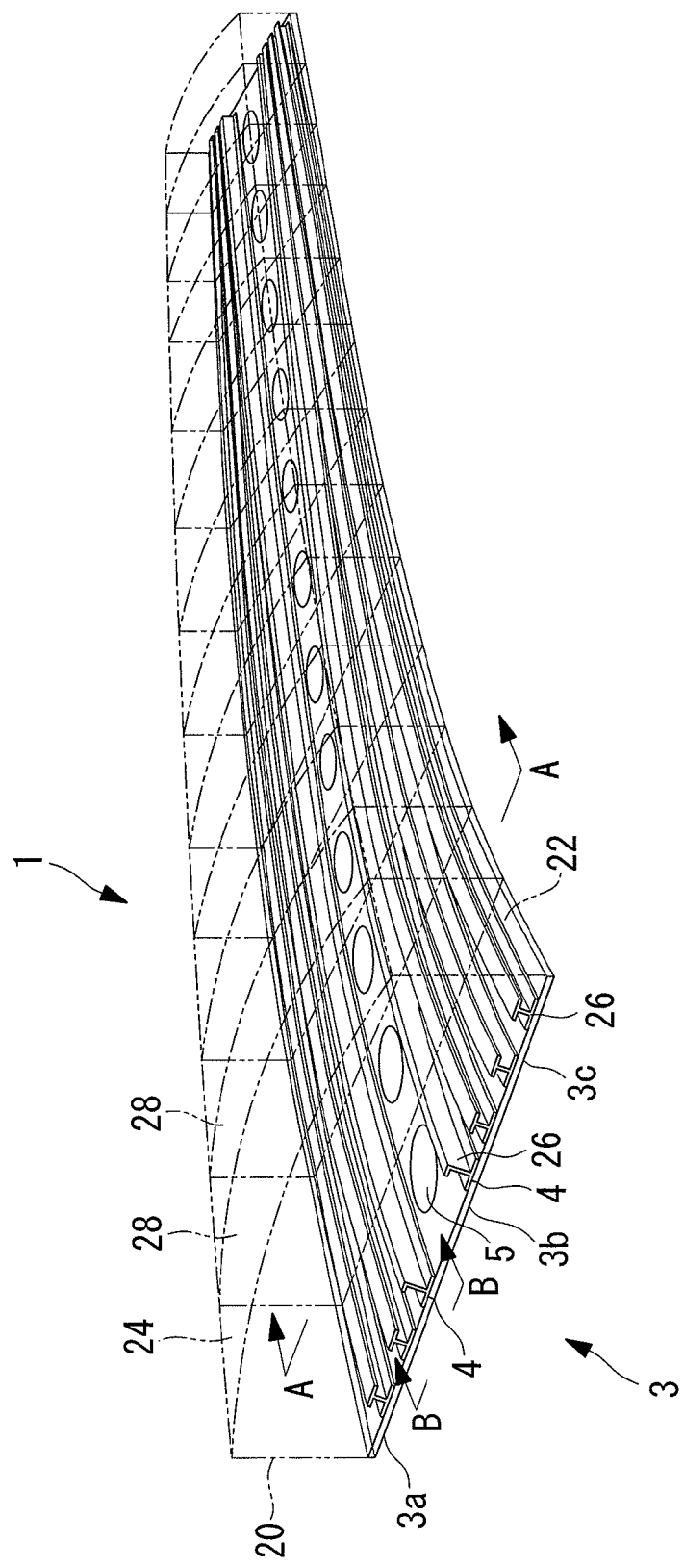
FIG. 2 is a perspective view showing the lower surface outer plate and stringers that configure a part of the wing formed in a box structure.
Figure 3:
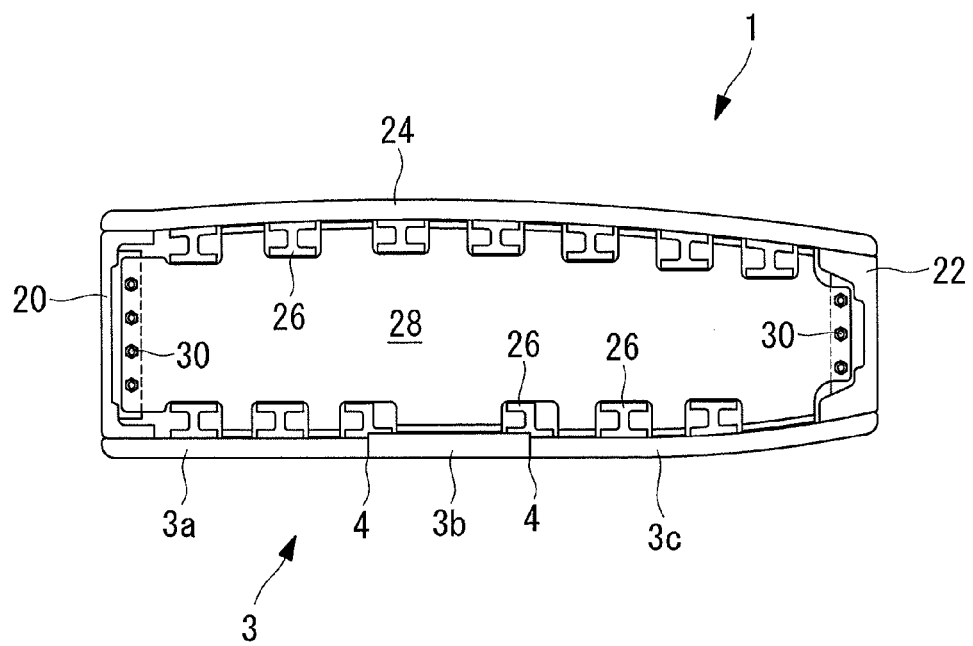
FIG. 3 is a cross sectional view taken along line A-A in FIG. 2.

As shown in FIGS. 2 and 3, the lower surface outer plate 3 forms a torque box having a box shape in conjunction with a front spar 20 and a rear spar 22, which are side surface outer plates, erected from both ends in the width direction of the lower surface outer plate 3 and an upper surface outer plate 24 that connects upper ends of the front spar 20 and the rear spar 22. The lower surface outer plate 3 bears a load of the wing 1.

The lower surface outer plate 3 is configured by three sections, i.e., a front section (an adjacent structure member) 3a located on the front edge side of the wing 1, a center section 3b connected to the front section 3a, and a rear section (an adjacent structure member) 3c connected to the center section 3b and located on the rear edge side of the wing 1. The front section 3a, the center section 3b, and the rear section 3c are joined to one another by fasteners or bonding on a division surface 4 extending in the longitudinal direction of the wing 1. A specific example of this joining method is explained below. However, the fastener joining or the bonding joining only has to be selected as appropriate. The fastener joining has an advantage that rigging is easy. The bonding joining has an advantage that a reduction in weight is possible.

As shown in FIGS. 2 and 3, a plurality of stringers 26 is provided in the longitudinal direction of the wing 1. The stringers 26 are composite materials made of FRP (fiber reinforced plastics). The respective stringers 26 are fixed to the inner surfaces of the lower surface outer plate 3 and the upper surface outer plate 24 and mainly bear a load in the longitudinal direction of the wing 1.

On the inside of the wing 1 formed in the box structure, ribs 28 are provided to divide an internal space of the wing 1 into a plurality of spaces in the longitudinal direction. The ribs 28 are formed in a plate shape extending over the width direction (a direction orthogonal to the longitudinal direction) of the wing 1. A plurality of ribs 28 are arranged at a predetermined interval in the longitudinal direction. As shown in FIG. 3, the front and rear ends of the respective ribs 28 are respectively fixed to the front spar 20 and the rear spar 22 by predetermined fasteners 30 such as bolts and nuts.

The front section 3a of the lower surface outer plate 3 is a composite material mainly formed of carbon fiber reinforced plastics (CFRP). A ratio of orientation of carbon fiber is set to a normal degree used in a structure of an aircraft. For example, when an extending direction (the longitudinal direction) of the wing 1 is 0°, a plurality of sheets having respective fiber directions are stacked to configure the composite material such that the ratio is (0°, +45°, −45°, 90°)=(30%, 30%, 30%, 10%). The number of stacked layers of the composite material used in the front section 3a is determined by bearing strength.

Like the front section 3a, the rear section 3c of the lower surface outer plate 3 is a composite material mainly formed of carbon fiber reinforced plastics (CFRP). Like the front section 3a, a ratio of orientation of carbon fiber is set to a normal degree used in a structure of an aircraft. For example, when an extending direction of the wing 1 is 0°, a plurality of sheets having respective fiber directions are stacked to configure the composite material such that the ratio is (0°, +45°, −45°, 90°)=(30%, 30%, 30%, 10%). The number of stacked layers of the composite material used in the rear section 3c is determined by bearing strength.

The center section 3b of the lower surface outer plate 3 is made of metal such as a titanium alloy or an aluminum alloy. In the center section 3b, a plurality of access holes (holes) 5 used during inspection, during assembly, and the like of a fuel tank provided in the wing 1 are formed at predetermined intervals along the extending direction of the wing 1. Consequently, the center section 3b is a structure member with holes. The access holes 5 are not formed in the front section 3a and the rear section 3c described above.

Figure 1B:
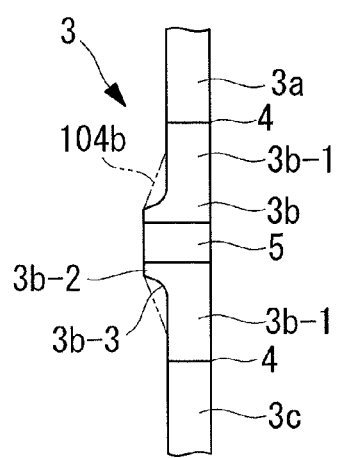
FIG. 1B is a longitudinal sectional view showing the lower surface outer plate of the wing of the aircraft according to the embodiment of the composite material structure of the present invention.
Figure 6A:
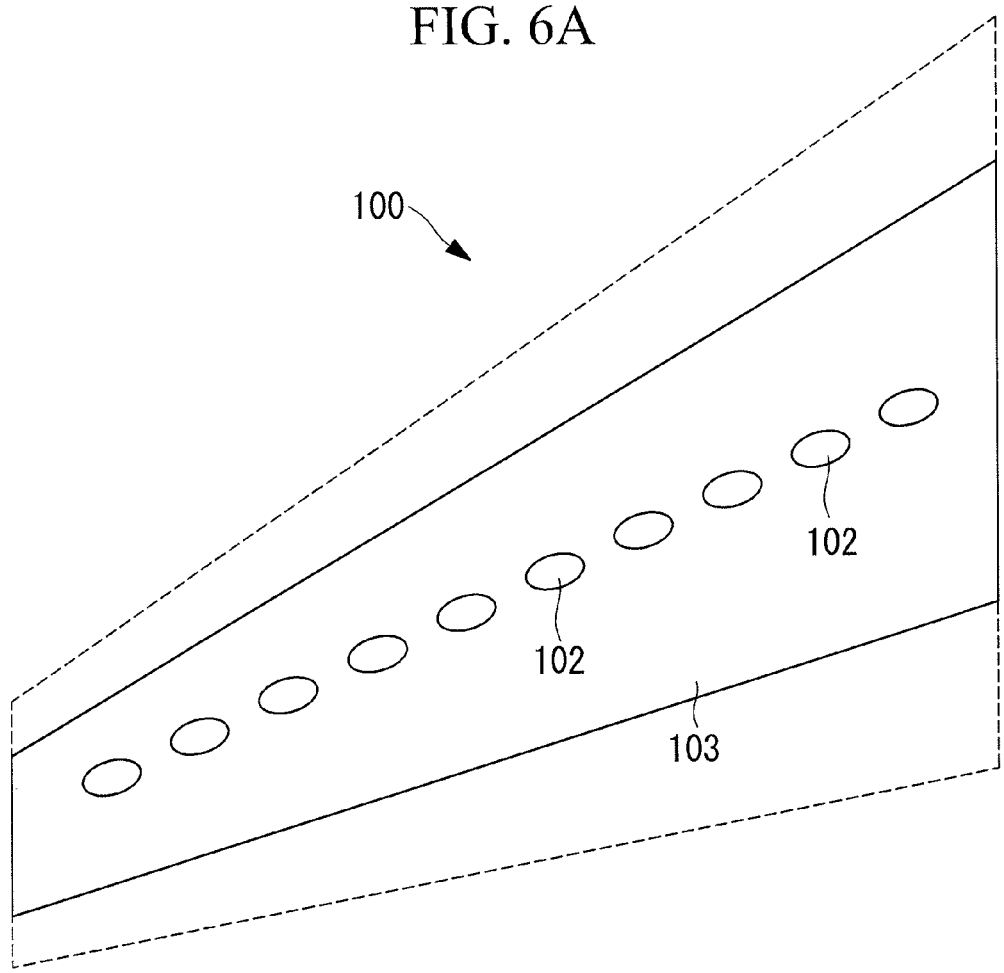
FIG. 6A is a plan view showing a lower surface outer plate of a conventional wing of an aircraft.
Figure 6B:
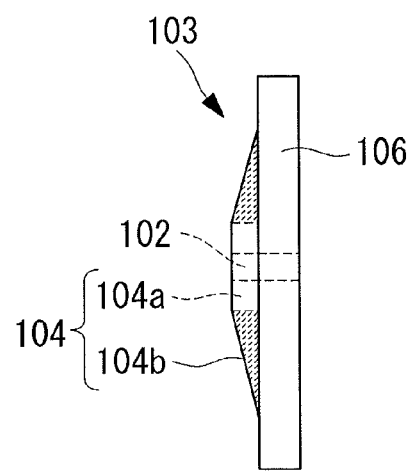
FIG. 6B is a longitudinal sectional view showing the lower surface outer plate of the conventional wing of the aircraft.

In the center section 3b, as shown in FIG. 1B, a fixed thickness region 3b-1 adjacent to the front section 3a and the rear section 3c is formed in thickness substantially the same as the thickness of the front section 3a and the rear section 3c. The fixed thickness region 3b-1 is provided so as to surround a peripheral edge region 3b-2 provided in the peripheral edge portion of the access hole 5. The peripheral edge region 3b-2 is further increased in thickness than the fixed thickness region 3b-1. The peripheral edge region 3b-2 increased in thickness is reinforcement against stress concentration that occurs in the peripheral edge portion of the access hole 5. The peripheral edge region 3b-2 and the adjacent region 3b-1 are connected by a fillet R treated portion 3b-3. That is, since the center section 3b is made of metal, it is possible to connect the peripheral edge region 3b-2 and the adjacent region 3b-1 using the fillet R treated portion 3b-3 without providing the taper portion 104b unlike the case in which fiber reinforced plastics is used (see FIG. 6B). Therefore, as shown in FIG. 1B in which the taper portion 104b is shown as a comparison, it is possible to eliminate excess thickness and realize a reduction in weight compared with the case in which the taper portion 104b is provided.

Next, a method of joining the center section 3b, the front section 3a, and the rear section 3c of the lower surface outer plate 3 is explained with reference to FIGS. 4A to 4E.

Figure 4A:
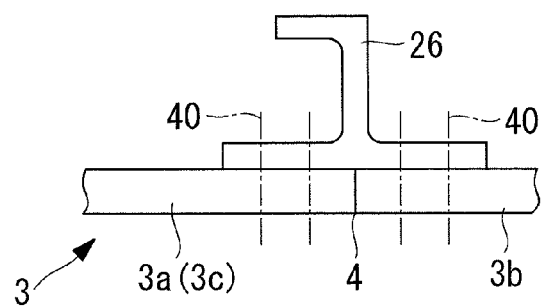
FIG. 4A is a cross sectional view taken along line B-B in FIG. 2 showing a method of fixing the stringers and the lower surface outer plate.

As shown in FIG. 4A, the stringer 26 and the lower surface outer plate 3 (the center section 3b, the front section 3a, and the rear section 3c) are fixed by a fastener 40 configured by a bolt, a nut, and the like in a position indicated by an alternate long and short dash line.

Figure 4B:
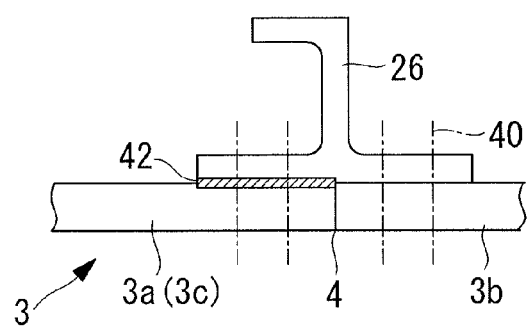
FIG. 4B is a cross sectional view taken along line B-B in FIG. 2 showing the method of fixing the stringers and the lower surface outer plate.

As shown in FIG. 4B, a method of bonding the stringer 26 and the lower surface outer plate 3 in a bonding portion 42 provided between the stringer 26 and the front section 3a (or the rear section 3c) and fixing the stringer 26 and the center section 3b using the fastener 40 may be adopted. A method opposite to the method shown in FIG. 4B may be adopted. That is, the stringer 26 and the front section 3a (or the rear section 3c) may be fixed by the fastener 40 and the stringer 26 and the center section 3b may be bonded in the bonding portion 42. The joining of the stringer 26 and the front section 3a (or the rear section 3c) may be joining by only the bonding. However, when bonding strength or reliability of the bonding strength is not sufficient, the fastener 40 may be used together with the bonding.

Figure 4C:
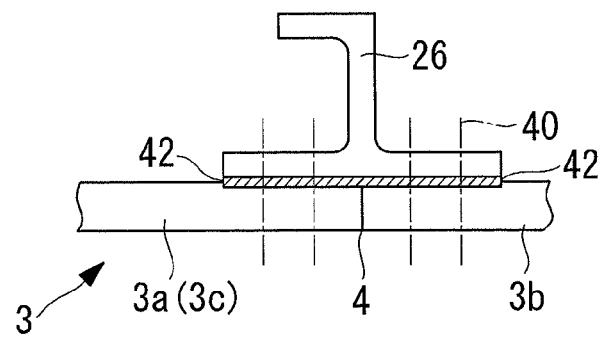
FIG. 4C is a cross sectional view taken along line B-B in FIG. 2 showing the method of fixing the stringers and the lower surface outer plate.
Figure 4D:
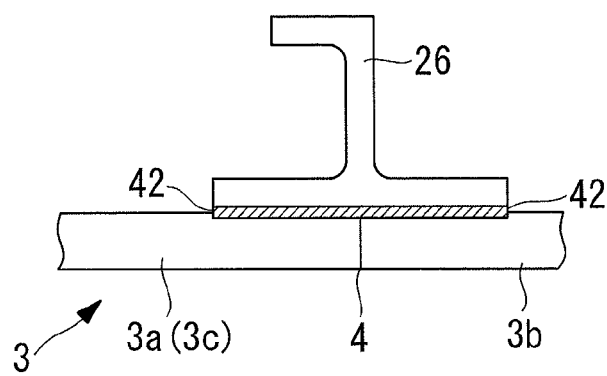
FIG. 4D is a cross sectional view taken along line B-B in FIG. 2 showing the method of fixing the stringers and the lower surface outer plate.

As shown in FIG. 4C, a method of bonding the stringer 26 and the lower surface outer plate 3 with the bonding portion 42 interposed between the stringer 26 and the front section 3a (or the rear section 3c) and between the stringer 26 and the center section 3b and thereafter fixing the stringer 26 and lower surface outer plate 3 by the fastener 40 may be adopted. As shown in FIG. 4D, a method of fixing the stringer 26 and the lower surface outer plate 3 only with the bonding in the bonding portion 42 without using a fastener may be adopted.

Note that, as the bonding, a method of curing both of the stringer 26 and the front section 3a (or the rear section 3c) and thereafter bonding the stringer 26 and the front section 3a (or the rear section 3c) using an adhesive (an after-cure bonding method) is used. Besides, for example, a co-bond method of interposing an adhesive between the stringer 26 after curing and the front section 3a (or the rear section 3c) before curing or between the stringer 26 before curing and the front section 3a (or the rear section 3c) after curing and thereafter applying temperature and/or pressure to integrally cure the stringer 26 and the front section 3a (or the rear section 3c) or a co-cure method of interposing an adhesive between the stringer 26 before curing and the front section 3a (or the rear section 3c) before curing and thereafter applying temperature and/or pressure to integrally cure the stringer 26 and the front section 3a (or the rear section 3c) is used.

Figure 4E:
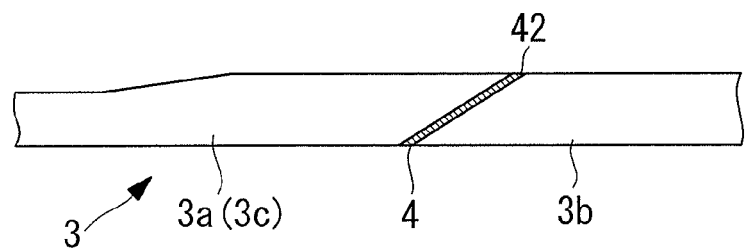
FIG. 4E is a cross sectional view taken along line B-B in FIG. 2 showing the method of fixing the stringers and the lower surface outer plate.

As shown in FIG. 4E, the division surface 4 may be provided to incline with respect to the plate thickness direction and bonded in the bonding portion 42. If the division surface 4 is formed as an inclined surface in this way, an area of overlap and contact of the center section 3b and the front section 3a (the rear section 3c) increases. Therefore, it is possible to more stably join the stringer 26 and the lower surface outer plate 3.

Next, the function effects obtained when the wing 1 including the configuration explained above is used are explained.

During flight, a load is applied to the wing 1 to displace the distal end of the wing 1 upward. Therefore, a tensile load is applied to the lower surface outer plate 3 of the wing 1 in the extending direction of the wing 1 (the 0° direction). The tensile load in the 0° direction causes stress concentration in the peripheral edge portion of the access hole 5 formed in the center section 3b. In this embodiment, since the center section 3b is made of metal, it is unnecessary to provide the taper portion 104b (see FIG. 6B) for peeling prevention in the hole peripheral edge portion unlike the case in which the center section 3b is a composite material made of fiber reinforced plastics. Therefore, since excess thickness for forming the taper portion can be eliminated, it is possible to realize a center section 3b that is reduced in weight.

Note that, in this embodiment, the application to the lower surface outer plate 3 of the wing 1 is explained. However, the present invention is not limited to this and can be widely applied to composite material structures including holes.

For example, a configuration that is the same as the lower surface outer plate 3 may be applied to an upper surface outer plate that configures a torque box in conjunction with the lower surface outer plate 3.

Figure 5:
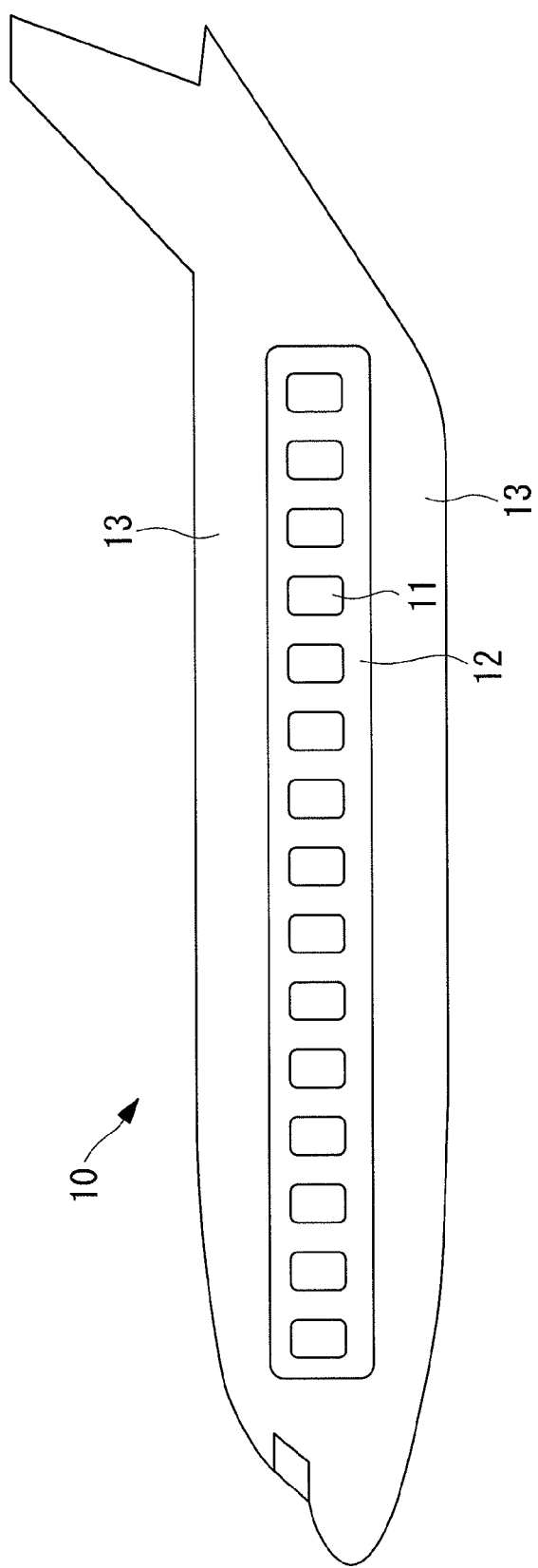
FIG. 5 is a side view showing another application example of the composite material structure of the present invention and showing a fuselage section of the aircraft.

As shown in FIG. 5, the center section 3b made of metal in the embodiment may be applied to a center section 12 of an aircraft fuselage 10 in which window holes 11, in which window materials are set, are formed. A material that is the same as the front section 3a and the rear section 3c in the embodiment may be applied to another member 13 adjacent to the center section 12.

Further, the composite material structure of the present invention is not limited to the aircraft and can be applied to a ship, a vehicle, and the like as well.

In the embodiment, carbon fiber reinforced plastics (CFRP) are mainly used. However, the present invention is not limited to this. For example, glass fiber reinforced plastics (GFRP) or aramid fiber reinforced plastics (AFRP) may also be used.

REFERENCE SIGNS LIST 1 wing
3 lower surface outer plate (composite material structure)

3a front section (adjacent structure member)
3b center section (structure member with holes)
3c rear section (adjacent structure member)
5 access holes (holes)

The invention claimed is:

1. A composite material structure for an aircraft comprising:
   a structure member with holes consisting of metal, the structure member with holes extending in one direction and having holes formed therein;
   an adjacent structure member formed as a composite material consisting of fiber reinforced plastics, the adjacent structure member extending in the one direction and being connected to a side portion of the structure member with holes and to a portion avoiding positions of the holes formed in the structure member with holes; and
   a plurality of stringers provided so as to extend in the one direction,
   wherein the structure member with holes includes:
      a fixed thickness region; and
      peripheral edge regions reinforcing peripheral edge portions of the holes, each of the peripheral edge regions being further increased in thickness compared to the fixed thickness region, and
   wherein regions other than the peripheral edge regions are not increased in thickness,
   wherein the side portion of the structure member with holes is connected to the side portion of the adjacent structure member at division surfaces extending in the one direction, or the division surfaces are provided so as to incline with respect to a plate thickness direction and are connected to each other,
   wherein one of the stringers extends in the one direction along the division surfaces, and
   wherein the one stringer is placed on the division surfaces, and is fixed to an inner surface of the structure member with holes and the adjacent structure member by fasteners configured by a bolt, a nut, and/or bonding.

2. The composite material structure according to claim 1, wherein
   a lower surface outer plate of a wing of an aircraft is configured by a plurality of members extending in a longitudinal direction of the wing, and
   among the members, a member including access holes as the holes formed in the lower surface outer plate is the structure member with holes and another member is the adjacent structure member.

3. The composite material structure according to claim 1, wherein
   an outer plate of a fuselage of an aircraft is configured by a plurality of members extending in a longitudinal direction of the fuselage, and
   among the members, a member including window holes as the holes formed in the outer plate is the structure member with holes and another member is the adjacent structure member.

4. An aircraft wing comprising the composite material structure according to claim 2.

5. An aircraft fuselage comprising the composite material structure according to claim 3.

6. A composite material structure for an aircraft comprising:
   a structure member with holes extending in one direction and having holes formed therein, wherein the structure member with holes consists of metal;
   an adjacent structure member formed of a composite material consisting of fiber reinforced plastics, wherein the adjacent structure member extends in the one direction and is connected to a side portion of the structure member with holes so that the adjacent structure member and the structure member with holes do not overlap at an edge of the hole; and
   a plurality of stringers provided in the one direction of the composite material structure at a position in which the structure member with holes is connected to the adjacent structure member,
   wherein the structure member with holes includes:
      a fixed thickness region; and
      peripheral edge regions reinforcing peripheral edge portions of the holes, each of the peripheral edge regions being increased in thickness compared to the fixed thickness region,
   wherein regions other than the peripheral edge regions are not increased in thickness relative to the fixed thickness region,
   wherein one of the stringers extends in the one direction along division surfaces at which the side portion of the structure member with holes is connected to the side portion of the adjacent structure member, and
   wherein the one stringer is placed on the division surfaces, and is fixed to inner surfaces of the structure member with holes and the adjacent structure member by fasteners configured by a bolt, a nut, and/or bonding.

* * * * *